R. MOSKOWITZ.
ANTISKID ATTACHMENT FOR TIRES.
APPLICATION FILED FEB. 27, 1917.
1,281,054.
Patented Oct. 8, 1918.
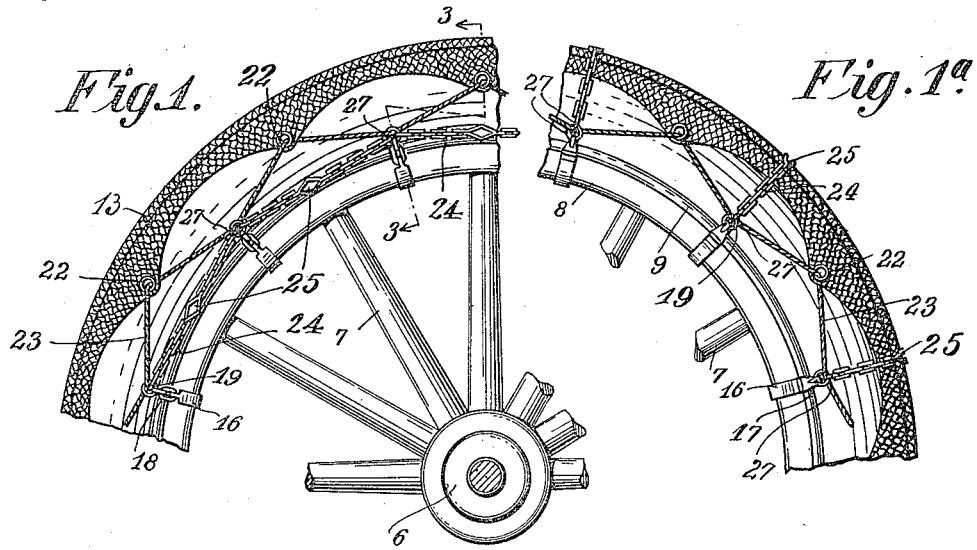
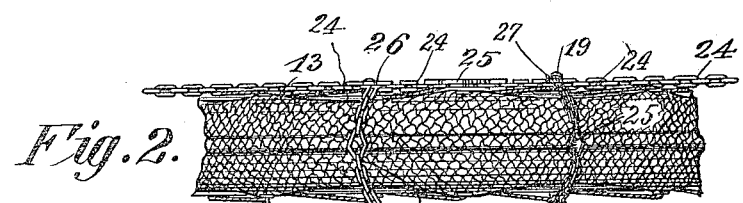
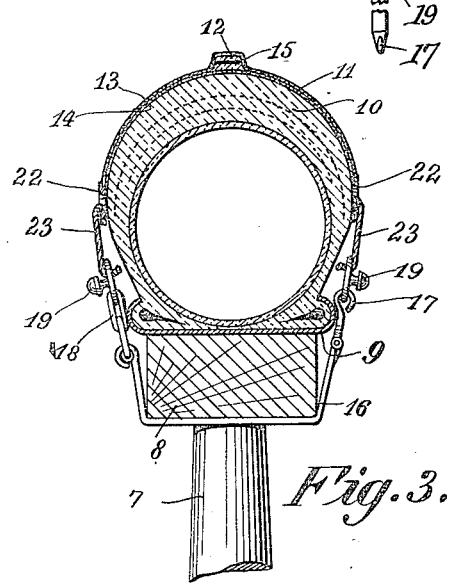
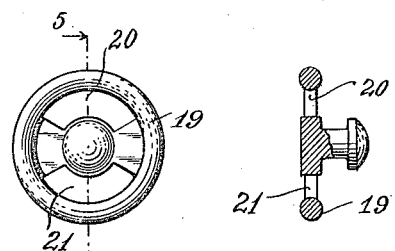
Inventor
Rudolph Moskowitz
By his Attorney
Walton Harrison ured a a# UNITED STATES PATENT OFFICE.

RUDOLPH MOSKOWITZ, OF DETROIT, MICHIGAN, ASSIGNOR OF ONE-HALF TO JONAS GEWIRTZ, OF NEW YORK, N. Y.

ANTISKID ATTACHMENT FOR TIRES.

1,281,054.

Specification of Letters Patent.

Patented Oct. 8, 1918.

Application filed February 27, 1917. Serial No. 151,154.

*To all whom it may concern:*

Be it known that I, RUDOLPH MOSKOWITZ, a citizen of the United States, residing at Detroit, county of Wayne, and State of Michigan, have invented certain new and useful Improvements in Antiskid Attachments for Tires, of which the following is a full, clear, and exact description.

My invention relates to anti-skid attachments for tires and particularly pneumatic tires of a kind suitable for use upon road wheels of automobiles and similar vehicles.

More particularly stated, I seek to produce an anti-skid attachment which may readily be placed upon a tire after the latter is in use upon a wheel.

By my invention I seek to accomplish the following results:

I. To render the attachment easy to remove and replace and to render its various parts to some extent interchangeable.

II. To provide the attachment with friction chains, which may be used either for preventing the wheel from skidding upon the ground or from jamming or rubbing against a curb or the like in such manner as to injure the tire.

III. To provide a detachable tread-web, having a tough rib for engaging the ground, this rib being relatively narrow in order to conserve the power used in propelling the vehicle and being so formed as to protect the tire and render it non-puncturable.

IV. To provide various parts and so connect the same as to increase the efficiency of the tire and of the non-skid attachment therefor.

Reference is made to the accompanying drawing forming a part of this specification, and in which like letters indicate like parts.

Figure 1 is a fragmentary side elevation of a vehicle wheel provided with a tire and carrying my improved anti-skid attachment, the friction chains being arranged in parallel formation to protect the tire in certain relations.

Fig. 1ª is a fragmentary side elevation of my device, the friction chains being arranged to prevent skidding.

Fig. 2 is a fragmentary top plan of the device, arranged as shown in Fig. 1ª.

Fig. 3 is a section on the line 3—3 of Fig. 1, looking in the direction of the arrows.

Fig. 4 is an elevation on an eyelet of special form employed as a part of my improved device.

Fig. 5 is a central section through the eyelet shown in Fig. 4.

A wheel-hub is shown at 6, spokes at 7, a felly at 8, and a rim at 9. The tire appears at 10. Mounted upon this tire is a tread-web 11 provided with a rib 12, the form of which may be readily understood from Fig. 3. The tread-web is provided with an outer strip 13, an inner strip 14, and an intermediate strip 15, these strips being made of any suitable fabric, preferably canvas. A filling of rubber, disposed between the outer and inner strips and enveloping the intermediate strip, constitutes the body of the rib. A number of anchor straps are shown at 16, each being provided with a hook 17 and a suspension link 18. This suspension link extends through and is connected with an eyelet 19 of special form, shown more particularly in Figs. 4 and 5. Each eyelet 19 is provided with two slots 20, 21, in order to facilitate the connection of various parts to the eyelet. The tread-web 11 is provided, adjacent its edges, with a number of eyelets 22 of ordinary construction. A pair of lacing cords are shown at 23, each of these cords being threaded alternately back and forth between the eyelets 22, carried by the tread-web, and the special eyelets 19, above described. The anchor straps 16 are used, in connection with the lacing cords, for holding the tread-web 11 and parts carried by it upon the wheel. For this purpose the anchor straps 16 are passed through the wheel and the hooks 17 brought up and connected with the adjacent eyelets 19, as may be understood from Fig. 3. If at any time, the tread-web happens to become loose or to sag, this can be corrected by tightening the lacing cords 23.

A number of friction chains are shown at 24. Each friction chain is at its middle provided with a shoe 25, this shoe having the form shown more particularly in Fig. 2,— that is, a so-called hollow diamond. Moreover, the shoe is bent into such form as to readily fit upon the rib, as may be understood from Fig. 2. Each friction chain 24 is provided with a link 26 at one of its ends, and at its opposite end with a hook 27, as may be understood from Fig. 2. The link 26 is permanently connected with one of the special eyelets 19, and the hook 27 is detachably connected with the opposite eyelet. By detaching the hook 27 from the eyelet with which it is associated upon the opposite side of the tire, and attaching it to another eyelet upon the same side of the tire, the friction chains may be disposed in planes parallel to the general plane of the tire, that is, in pairs, the chains of each pair being upon opposite sides of the tire.

Thus upon one side of the tire—say the side corresponding to the outer face of the wheel—the chains 24 may always remain extending in a linear direction parallel to the general plane of the tire, and upon the opposite side of the tire the chains may be connected to extend parallel to the general plane of the tire or may be extended transversely thereof, as desired. Any chain in the system, however, may occupy either of two normal positions provided the other chains are disposed accordingly.

When the friction chains are extended across the outer peripheral surface of the tire, they serve to prevent the tire from skidding. When, however, they are disposed upon opposite sides of the tire and substantially parallel to each other, they serve the purpose of preventing the tire from being chafed in the event that the wheel is moved against a curb or other rough surface extending upwardly a little distance from the ground.

The purpose in having the shoe 25 of diamond shape is to give it a biting edge for gripping the surface of the ground.

The purpose of having the rib 12 comparatively narrow is to conserve the power used in propelling the vehicle. By having the rib narrow, there is a comparatively small surface of the wheel resting upon the ground at any particular moment, and because of this fact the energy used to propel the vehicle is less than would be the case if the rib were much wider. This is particularly the case in instances where the wheel is used upon roads containing viscous materials, such as asphalt or bitumen.

The thickness, toughness and general construction of the rib render it comparatively hard to injure, and it thus serves in great measure to render the tire nonpuncturable.

I do not limit myself to the precise construction shown and variations may be made therefrom without departing from the spirit of my invention.

I claim:—

1. In a device of the character described, the combination of a tread-web having a rib, said rib consisting of an inner strip of fabric, an outer strip of fabric, and an intermediate strip of fabric, and a body portion disposed between said outer strip and said inner strip and enveloping said intermediate strip.

2. In a device of the character described, the combination of a tread-web provided with a rib, means for securing said tread-web upon a tire, and a friction chain carried by said tread-web and provided with a shoe for fitting upon said rib.

3. The combination, with a tire and a friction chain to be detachably stretched crosswise thereof in order to prevent the tire from skidding, of means for detachably supporting said friction chain stretched alongside of said tire, in a linear direction parallel to the general plane of said tire in order to prevent said tire from chafing.

4. The combination, with a tread web, means for detachably supporting the same upon a tire, and a friction chain to be detachably stretched across the face of said tread web to prevent the tire from skidding, of means for detachably stretching said friction chain upon one side of said web and said tire, in a linear direction parallel to the general plane of said tire, in order to protect said tread web and said tire from chafing.

RUDOLPH MOSKOWITZ.